United States Patent [19]

Buchroeder et al.

[11] Patent Number: 4,623,776
[45] Date of Patent: Nov. 18, 1986

[54] RING OF LIGHT LASER OPTICS SYSTEM

[75] Inventors: Richard A. Buchroeder; Eric M. Palmer, both of Tucson; Yefim P. Sukhman, Phoenix, all of Ariz.

[73] Assignee: Dow Corning Corporation, Midland, Mich.

[21] Appl. No.: 688,664

[22] Filed: Jan. 3, 1985

[51] Int. Cl.⁴ ............................................. B23K 26/00
[52] U.S. Cl. ...................... 219/121 LG; 219/121 LQ; 219/121 LR; 219/121 LP; 350/172; 350/629
[58] Field of Search ................. 219/121 LG, 121 LH, 219/121 L, 121 LP, 121 LQ, 121 LR; 350/184, 165, 171, 172, 293

[56] References Cited

U.S. PATENT DOCUMENTS

| 3,419,321 | 12/1968 | Barber et al. ........................ 350/8 |
| 3,848,970 | 11/1974 | Goodell .......................... 219/121 LR |
| 3,920,951 | 11/1975 | Chovan et al. .................. 219/121 L |
| 3,941,973 | 3/1976 | Luck et al. ...................... 219/121 L |
| 3,947,093 | 3/1976 | Goshima et al. ..................... 350/189 |
| 3,972,599 | 8/1976 | Engel et al. ........................ 350/294 |
| 4,275,288 | 6/1981 | Makosch et al. ............... 219/121 LR |
| 4,456,811 | 6/1984 | Hella et al. ..................... 219/121 LQ |

FOREIGN PATENT DOCUMENTS 0181790 11/1982 Japan ............................. 219/121 LR
2031973  4/1980 United Kingdom .

OTHER PUBLICATIONS

*Laser Machining and Welding,* N. Rykalin, et al., MIR Publishers, Moscow, USSR, Appendix 4, pp. 292–294 (in English).

*Primary Examiner*—M. H. Paschall
*Attorney, Agent, or Firm*—Richard E. Rakoczy

[57] ABSTRACT

This invention provides a simplified laser optics system for generating a ring-shaped beam of laser radiation which is used for contouring and severing a curved, particularly a dome-shaped, article such as a silicone elastomer contact lens from a workpiece. The laser optics system consists essentially of a focussing element having a convex surface which receives a circular beam of laser radiation and an opposed conical surface forming an axicon which element transforms the circular beam into a ring-shaped beam of laser radiation. The ring-shaped beam is received by a reflective element having a conical reflective surface which causes the beam to impinge upon the curved workpiece surface, preferably at an angle which is substantially perpendicular to the workpiece surface, to accomplish edge contouring and severing of the article from the workpiece.

7 Claims, 5 Drawing Figures

RING OF LIGHT LASER OPTICS SYSTEM

This invention relates to a simplified laser optics system for generating a ring-shaped beam of electromagnetic radiation of the type generated by a laser source which consists of a combination of a focussing element and a reflective element having a conical reflective surface which is placed in the path of a circular beam of such radiation. The laser optics system is particularly useful for edge contouring and severing dome-shaped products such as eye contact lenses from a workpiece.

Laser optics systems for generating ring-shaped beams of electromagnetic radiation from laser sources are taught in U.S. Pat. No. 3,419,321 to Barber, et al. (issued Dec. 31, 1968), U.S. Pat. No. 3,972,599 to Engel, et al. (issued Aug. 3, 1976) and U.S. Pat. No. 4,275,288 to Makosch, et al. (issued June 23, 1981). The Barber, et al. and Makosch, et al. patents use axicons to generate a ring-shaped beam of laser radiation and pass the ring-shaped beam through a focussing lens before striking a flat workpiece which is to be drilled or welded by the beam. Makosch, et al. uses the focussing lens between the workpiece and the axicon to adjust the energy density distribution of the beam striking the target. Use of a lens between the workpiece and the axicon has a disadvantage in that a relatively high concentration of laser radiation can be focussed on that lens when the workpiece (and therefore the focussing lens) is located relatively close to the axicon because of the diameter of the beam desired (see region 18 in FIG. 4 of Makosch which is such a high density area). This concentration of radiation can cause the lens to heat up which can lead to degradation and possibly failure of the lens, particularly where high powered laser sources (e.g., laser sources generating beams of greater than several hundred watts of power) are to be used with such optics systems. Makosch mentions that a catoptric or reflecting device might be used instead of a diopteric or refracting axicon.

Engel, et al. teach the use of a tubular axicon having a reflective inner surface with a circular or slightly frustoconical cross-section to receive a laser beam from a beam focussing means which is preferably a concave reflecting mirror to provide the desired level of depth of laser beam focus by having the tubular axicon reflect the diverging laser beams from the concave mirror back to an elongated focus.

Other publications showing combinations of focussed laser beams with reflecting mirrors are U.S. Pat. No. 3,920,951 to Chovan, et al. (issued Nov. 18, 1975) and U.S. Pat. No. 3,941,973 to Luck, et al. (issued Mar. 2, 1976) and UK Patent Application GB No. 2 031 793 A to Helbig (published Apr. 30, 1980). These publications deal with welding, cutting and imaging with laser beams, but do not deal with ring-shaped beams of laser radiation.

SUMMARY OF THE INVENTION

It is one object of this invention to provide a simplified laser optics system for generating a ring-shaped beam of electromagnetic radiation from an appropriate laser source which produces a beam of a wavelength and power which is sufficient to accomplish the edge contouring and severing of an article, preferably a finished article, from a workpiece. By substituting a reflective element for a focussing lens which is located in areas of the laser beam where relatively high concentrations of energy are located, the possibility of overheating and degrading a refractive focussing lens is reduced for those applications where the workpiece is located close to the axicon to obtain a particular beam diameter.

It is one primary object of this invention to provide a laser optics system for generating a ring-shaped laser beam which is suitable for edge contouring and severing from a workpiece an article such as a lens which has at least one curved surface. This laser optics system is especially useful when dome-shaped lenses such as elastomeric eye contact lenses are to be simultaneously edge contoured and severed from a workpiece, preferably using two opposed sets of the laser optics systems of the present invention. This laser optics system permits the ring-shaped beam to impinge upon the curved workpiece surface at an angle which generates the desired edge contour and the ring-shaped beam is preferably directed at an angle which is substantially perpendicular to the curved surface of the workpiece.

Another object of this invention is to provide a laser optics system which can be used to edge contour and sever a curved or dome-shaped workpiece simultaneously from opposite sides of the workpiece using two opposed laser optics systems.

These and other objects of the present invention are provided by a laser optics system which consists essentially of a focussing element for receiving a circular beam of electromagnetic radiation from a laser source such as an infrared radiation laser source wherein the focussing element is situated concentrically with the central long axis of the beam and has two opposed surfaces, one of which is a convex surface for focussing the beam and the opposite surface is a conical surface which forms an axicon element which faces the workpiece and transforms the circular beam into a ring-shaped beam which is then received by a reflective element having a conical reflective surface situated at such an angle and in such a position relative to the central long axis of the ring-shaped beam to cause a focussed ring-shaped beam of a preselected diameter to be impinged upon a curved workpiece surface located beyond the focussing element and the reflective element at a preselected angle with respect to the curved surface of the workpiece.

The laser optics system has as few elements as possible to minimize element alignment problems. Use of a conical reflecting element in place of a refractive lens has the important advantage that the focussed laser beam emerging from the axicon is changed in diameter by the conical reflective element without changing its focus. As a result, one conical reflective element can be substituted for another to substantially change the diameter (small diameter changes can be made simply by moving the conical reflective element back and forth along the central long beam axis 130 of FIG. 1) of the beam without having to refocus the beam emerging from the axicon. Refocussing is necessary in prior art laser optics systems when a change in refractive focussing lenses is made. By minimizing movement of the lenses, a laser optics system which is simpler and easier to maintain in focus during use is obtained.

BRIEF DESCRIPTION OF THE DRAWINGS

The above and other objects, features and advantages of the present invention will become apparent to those skilled in the art upon an examination of the following description and drawings which are descriptive of certain embodiments of the present invention. A preferred embodiment of the present invention is illustrated in the accompanying drawings to enable those skilled in the art to better practice the present invention. In the Drawings.

DETAILED DESCRIPTION OF THE INVENTION

Figure 1:
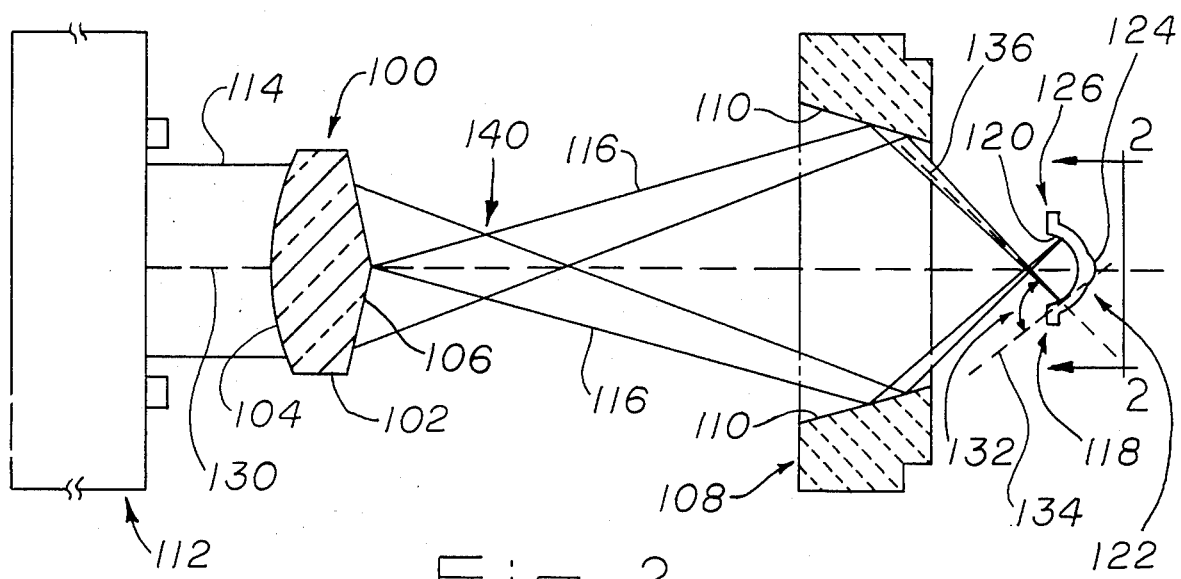
FIG. 1 is a view, shown in cross-section for clarity, of a laser optics system of the present invention having a focussing element 100 and a reflective element 108 and also showing the positioning of a laser source 112 and a curved workpiece 118 containing a dome-shaped eye contact lens 122.
Figure 2:
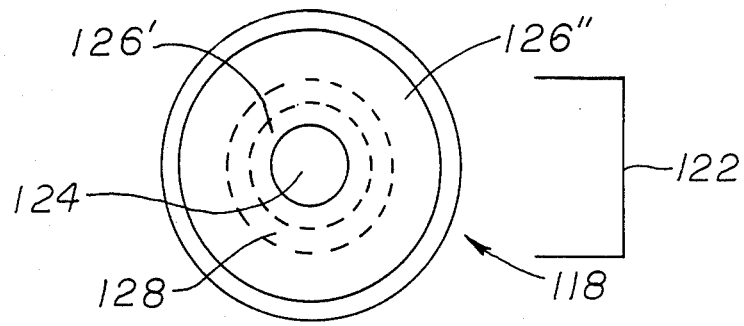
FIG. 2 is a rear view of the workpiece taken along line 2—2 showing as dotted lines the ring-shaped area 128 to be contoured by the beam.

Referring to the Drawings, FIG. 1 illustrates one embodiment of the laser optics system of the present invention shown as a combination of focussing element 100 shown as fixed focus lens 102 having a convex surface 104 which is located opposite conical surface 106 which forms an axicon and reflective element 108 shown as a hollow circular element having an interior reflective surface 110. The reflective element does not have to be hollow; it could be a solid cone with a reflective outer surface. Laser source 112 projects a circular beam 114 of laser radiation which enters surface 104 and is transformed into a ring-shaped beam 116 of laser radiation. Beam 116 is reflected from surface 110 and impinges upon curved surface 120 of workpiece 118. Workpiece 118 contains a dome-shaped article in the form of a central eye contact lens 122. As is shown more clearly in FIG. 2, lens 122 has a central optical region 124 and a surrounding peripheral region 126 which is divided into two regions 126' and 126" by ring-shaped area 128 which represents the area that is to be contoured by beam 116 and, ultimately, represents the juncture at which an edge contoured eye contact lens 122 composed of central optical region 124 and peripheral region 126' will be severed from the remainder of peripheral region 126' of work-piece 118. Laser source 112, lens 102, reflective surface 110 and contact lens 122 are all aligned so that each is concentric with central optical axis 130 of circular beam 114 and thus ring-shaped beam 116 is likewise concentric with axis 130.

As will be more fully described, infra, the angle of reflective surface 110 relative to axis 130 is selected to be such that the focal line of ring-shaped beam 116 is caused to impinge on surface 120 at a preselected diameter represented by the center of area 128. The central long axis 136 of beam 116 impinges upon surface 120 at an angle 132 relative to tangent line 134 which is taken at the point where beam 116 impinges upon surface 120. Preferably, angle 132 is substantially 90 degrees (i.e., perpendicular to surface 120) when an eye contact lens is to be edge contoured, particularly for eye contact lenses of silicone elastomer material so that an eye contact lens having a substantially symmetrical edge contour is obtained. This configuration eliminates the need for a focussing lens to be placed between the conical surface 106 and the workpiece 118 thereby avoiding placing an element in the region located in the area of reference point 140 where a relatively high concentration of laser radiation is located. Reflective element 108 does not focus beam 116, it only changes the diameter of the ring-shaped beam 116 on the workpiece by reflecting the focussed beam emerging from element 100.

Figure 3:
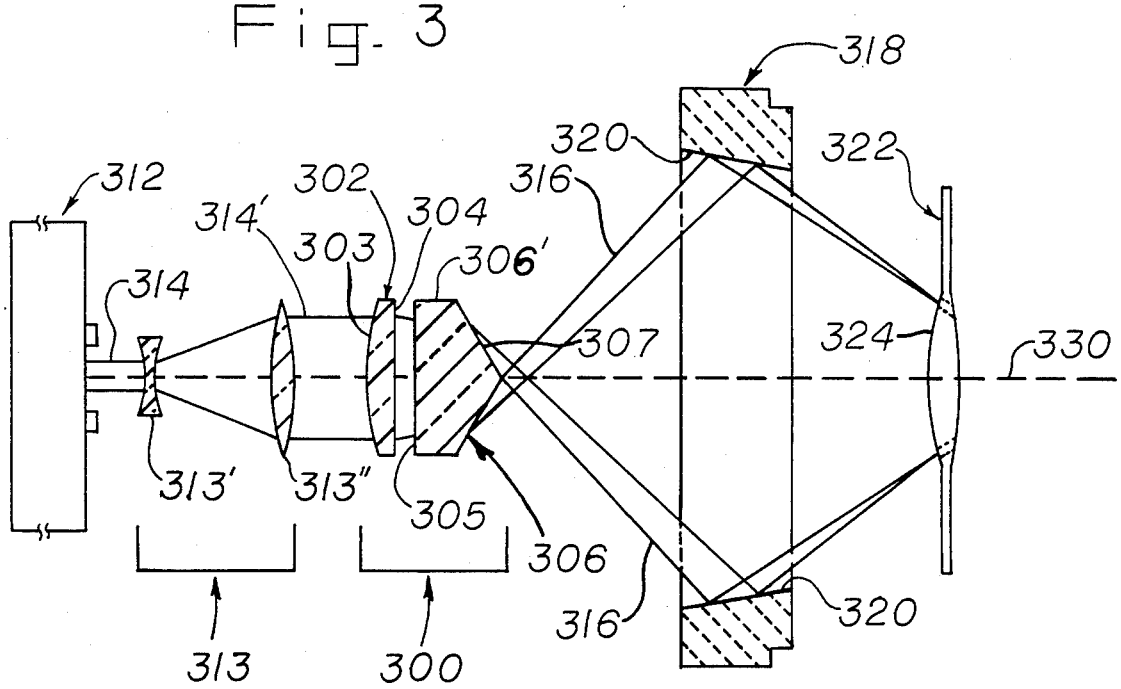
FIG. 3 is an alternate embodiment of the lens optics system of FIG. 1 where the focussing element 300 is composed of two elements 302 and 306 and includes an optional beam expander/collimator 313.

FIG. 3 shows an alternative embodiment of the laser optics system of the present invention which employs a focussing element 300 which has an adjustable focal length. Laser source 312 generates a circular beam 314 of laser radiation which is projected into optional beam expander/collimator 313 of a conventional type which is shown here as being composed of a biconcave lens 313' and a biconvex lens 313" which together act on beam 314 to generate an expanded beam 314' of a diameter suited for use with the size of the laser optics system selected. Element 300 is composed of lens 302 which has a convex surface 303 which receives circular beam 314' of laser radiation and an opposed plano surface 304 which faces plano surface 305 of axicon 306 which has conical surface 307 which forms an axicon opposite surface 305. Lens 302 and axicon 306 are best situated as close as possible to each other to minimize heat buildup within these elements. As in FIG. 1, all beams and elements are located concentric with central long axis 330 of beam 314.

The size and position of reflective element 318 is selected to suit the axicon used and the diameter of the ring-shaped beam desired in a manner known to those skilled in the art.

Lens 302 focusses beam 314' on axicon 306 which converts circular beam 314' into ring-shaped beam 316 which is reflected by the hollow conical interior reflective surface 320 of reflective element 318 onto curved surface 324 of workpiece 322. The angle of conical reflective surface with respect to central optical axis 330 is selected such that circular beam 316 strikes surface 324 as shown in FIG. 1 and the angle at which the central long axis of beam 316 impinges upon surface 324 is substantially perpendicular to a tangent to surface 324 at the point of impingement. In both FIGS. 1 and 3, the diameter of the ring-shaped beam impinging on the surface of the workpiece can be altered by moving the reflective element along axis 130 and 330, respectively. In this embodiment, the focal point of ring-shaped beam 314' can be varied by moving lens 302 along axis 330 relative to axicon 306.

A number of different electromagnetic radiation sources to provide laser radiation beams can be used such as those generating beams having a wavelength in the ultraviolet, visible light or infrared spectrum. Useful laser radiation sources and appropriate lens materials and reflecting surfaces which are designed to refract or reflect the laser beam emanating from the source will be apparent to those skilled in the art after a review of this specification and drawings and upon consideration of the nature of the material which is to be contoured and severed from the workpiece. For example, zinc selenide can be used as a refractive lens material and chromium gold coatings can be used as a reflective material when infrared laser beams having a 10.6 micron wavelength are to be used. For example, see "Electrothermal Cutting Processings Using a CO₂ Laser" by J. E. Harry, et al., in IEEE Transactions on Industry Applications, Vol 1A-8, No. 4, July/August 1972 for considerations affecting the choice of lasers relative to the material to be contoured.

The laser optics system described herein is particularly suited for the edge contouring and severing of lenses, particularly eye contact lenses, as is further detailed in U.S. patent application Ser. No. 06/688,491 entitled "Method and Apparatus for Edge Contouring Lenses" which is being filed concurrently herewith in the names of Richard T. Miller, Yefim P. Sukhman and Lynn C. Welker, is assigned to the same assignee as in the present invention and describes a preferred manner in which the laser optics system of the present invention can be used as will be described, infra, with references to FIGS. 4 and 5.

Figure 4:
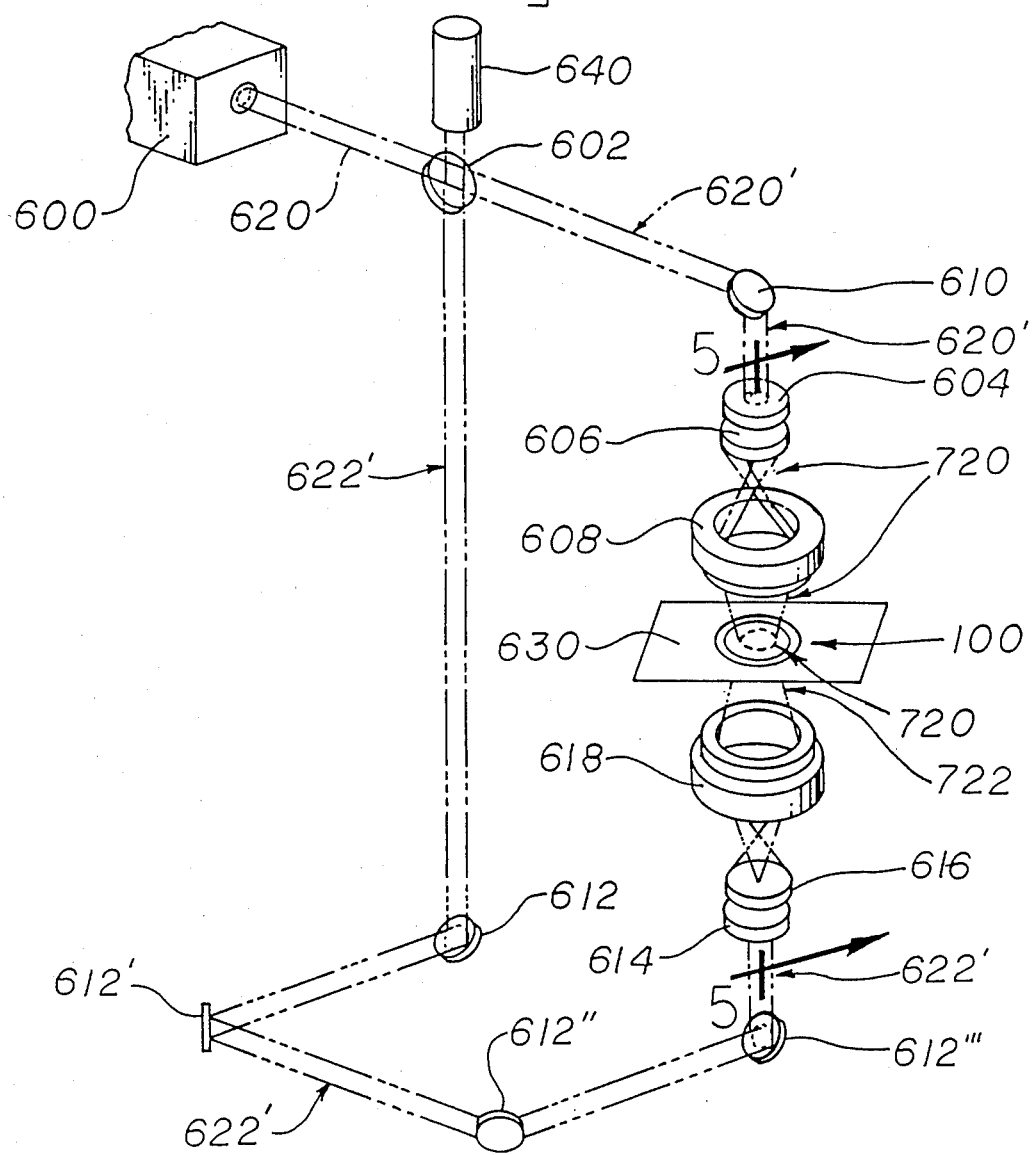
FIG. 4 is a schematic representation of the functional elements of the lens optics system of the present invention when used in an apparatus to accomplish simultaneous edge contouring and severing of a dome-shaped lens.
Figure 5:
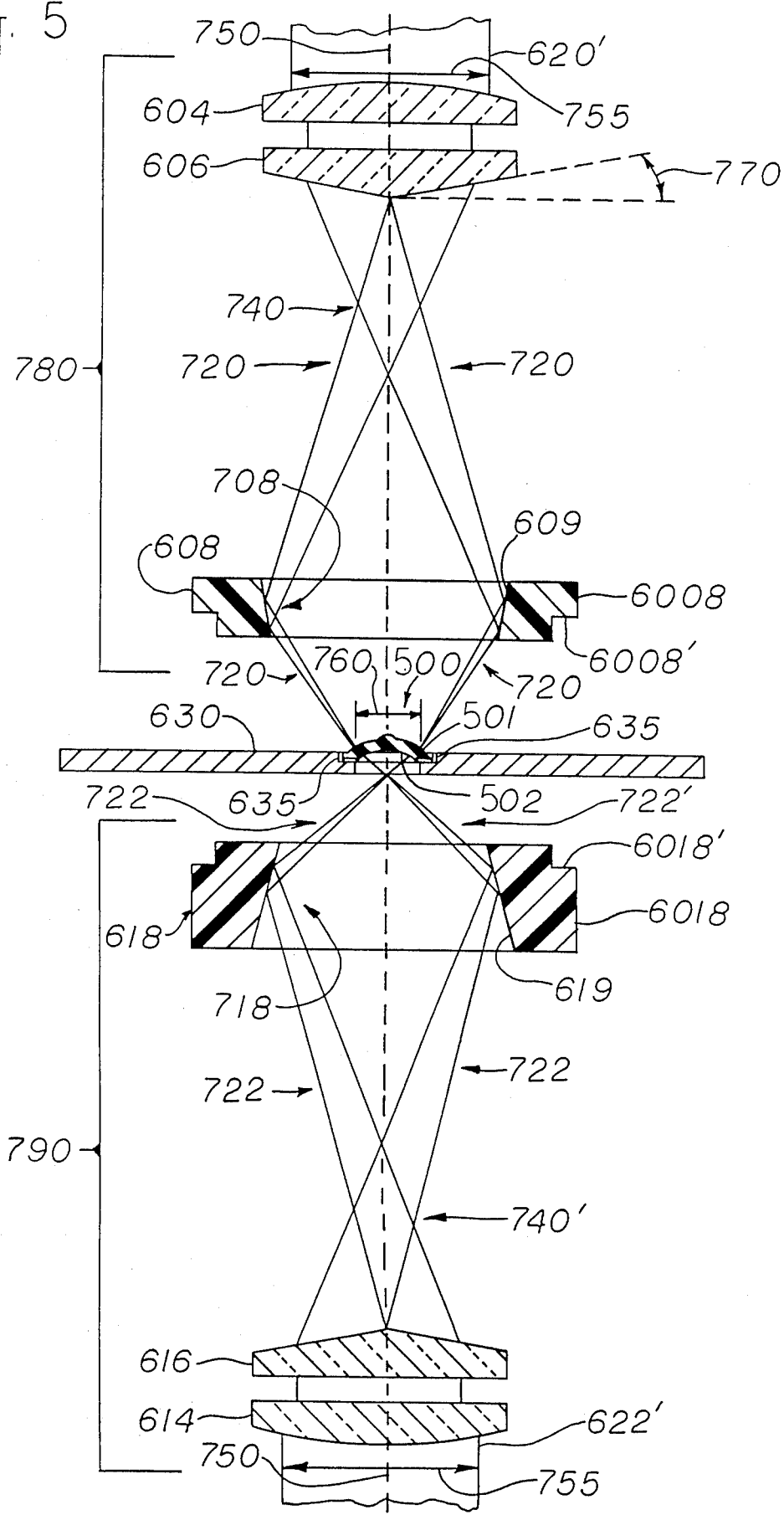
FIG. 5 is a cross-sectional view of FIG. 4 taken along section line 5—5 showing each of the preferred first and second laser optics systems used to generate ring-shaped beams of laser radiation.

When the reflective element is appropriately angled with respect to the central long axis of the laser beam, a pair of laser optics systems can be situated opposite each other to accomplish simultaneous edge contouring and severing of a curved or dome-shaped article such as a lens or an eye contact lens because the ring shaped beam projects outwardly away from the opposing laser optics system as illustrated in FIGS. 4 and 5.

The article in the workpiece may also be contoured and severed from the workpiece from one side only, or can be contoured from one side and then turned to contour the other side and sever the article from the workpiece.

To avoid moving the workpiece, one side can be contoured and then the other side of the article can be contoured and severed from the workpiece by using one laser source with a tiltable mirror to direct the ring-shaped beam first through one set of laser optics and then through the opposite set of laser optics.

If both sides of the article are to be contoured, the article is preferably contoured from both sides simultaneously as shown in FIGS. 4 and 5. Simultaneous contouring and severing is preferred when elastomeric materials are to be contoured on both sides since such materials may tend to sag after the first surface is contoured and cause deviations from circularity and edge contour uniformity when the second side is subsequently done.

The laser optics systems shown herein are quite advantageous where thermoset materials such as silicone elastomers are to be contoured because such materials require a relatively high powered laser source such as a carbon dioxide gas laser having a beam of radiation with a wavelength of 10.6 microns which is in the infrared spectrum. Various types of lasers, particularly carbon dioxide lasers of relatively high power, are commercially available from PRC, Inc., 2652 S. Main Street, Kennesaw, Ga. 30144, Spectra-Physics, Inc., 3333 N. First Street, San Jose, Calif. 95134, and Photon Sources, Inc., 12165 Globe Road, Livonia, Mich. 48150 and other laser manufacturers.

Referring now to FIGS. 4 and 5, an embodiment utilizing two opposed laser optics systems of the present invention for the simultaneous edge contouring and severing of an eye contact lens from a workpiece will now be described. The workpiece containing the article to be contoured can be of any material which is sufficiently reactive with the type of laser beam to be used to accomplish contouring of the material when the ring-shaped beam is focussed upon the material. The embodiment described will be with reference to a silicone elastomer contact lens as described in the Miller, et al. patent application, supra, and for that material, a laser source generating a beam having a wavelength in the infrared spectrum is presently preferred where the lasing medium is carbon dioxide gas to produce a beam with a wavelength of 10.6 microns.

It is believed that when a single carbon dioxide laser source having a nominal power output of about 1500 watts using a conventional beam splitter as shown in FIG. 4 is used to contour a workpiece containing a silicone elastomer contact lens with a peripheral region having a thickness of about 0.090–0.011 mm (0.0035–0.0045 inches), a single pulse in the 4–7 millisecond range with an energy of about 10 joules on each surface of the workpiece to be contoured should be sufficient to contour and sever such a contact lens with no more than about a 5 millisecond pulse duration presently being preferred to avoid charring of the lens material when using a carbon dioxide laser. Since the ring-shaped beam covers a larger area than a thin circular laser beam, the energy concentration at any one point is reduced relative to that of a thin circular beam and higher powered laser sources are needed to obtain a sufficient level of energy at the surface for contouring and severing the lens from the workpiece. Use of excessive pulse time can result in charring of the edge of the lens. The beam quality, power, pulse width and shape of the pulse is matched to the material to be contoured in a manner which will be apparent to those skilled in the art. The diameter of the laser beam entering the laser optics system should be fairly uniform so that the ring-shaped beam contours the lens fairly uniformly. As is well known, a conventional spatial filter (not shown) can be placed within the path of the laser beam to make the beam more uniform in cross-sectional power density at some loss in power at the workpiece surface.

Referring to FIGS. 4 and 5, circular laser beam 620 emerges from carbon dioxide laser source 600 after being passed through a conventional beam expander/collimator within source 600 such that the beam 620 strikes beam splitter 602 which is a double plano disk which can be made of an optical grade of zinc selenide having an antireflective coating for 10.6 microns at 45° incidence on one side of the beam splitter 602 and a dielectric coating which is 50% reflective and 50% transmissive for 10.6 microns at 45° incidence on the opposite side. In the single laser beam source 600 configuration shown, circular beam 620 is split by beam splitter 602 into two beams 620' and 622' which each have one half of the energy of the original beam 620.

Beam 620' is directed at mirror 610 by beam splitter 602 and is reflected to the upper laser optics system 780 which consists of refractive lens 604, a refractive ring-forming element in the form of axicon 606 and internally reflective cone 608. As is shown more clearly in FIG. 5, beam 620' passes through refractive focussing element 604 which is used to focus the ring-shaped beam 720 on surface 501 of workpiece 500. Axicon 606 is used to transform circular beam 620' into a ring-shaped beam 720, the focal point of which is adjusted by means of lens 604. After beam 720 emerges from axicon 606, reflective cone 608 is used to adjust the diameter 760 of beam 720 impinging upon surface 501 of workpiece 500. The angle of reflective surface 609 of cone 608 relative to central optical axis 750 determines the angle at which beam 720 strikes surface 501 thereby enabling one to contour a variety of dome-shaped workpieces having anterior and posterior surfaces of different radii of curvature by substituting cones with reflective surface angles designed to suit the lens to be contoured.

The lower laser optics system 790 is composed of elements of the same type as the upper laser optics system. Thus, circular beam 622' is reflected from beam splitter 602 consecutively to mirrors 612, 612', 612" and 612''' such that beam 622' passes into refractive lens 614 and axicon 616 emerges as ring-shaped beam 722 which is projected at internally reflective cone 618 which alters the diameter and angle of beam 722 relative to surface 102 such that beam 722 impinges upon surface 502 of workpiece 500 at the desired diameter and angle for contouring and severing the lens contained in workpiece 500.

Workpiece 500 is positioned between the upper and lower laser optics systems 780 and 790 by placing it in a holder 630 having a recess 635 with an open central portion which is adapted to receive workpiece 500 in such a manner that the central optical axis 750 passes through the center of the central optical region of workpiece 500.

In accordance with well known procedures, all elements of the laser optics systems are positioned and aligned so as to be concentric with central optical axis 750 as shown in FIG. 5 so that the center of each ring-shaped beam 720 and 722 produced lies on axis 750. Each mirror and lens element is mounted in accordance with well known procedures in such a manner as to permit the elements to be moved from side to side perpendicular to axis 750 or up and down along axis 750 to achieve optimum alignment.

Lenses 604 and 614 are each mounted so as to be movable along axis 750 to permit focussing of the ring-shaped beams during operation of the apparatus. Optionally, axicons 606 and 616 can be moved in such a direction, but it is more desirable that axicons 606 and 616 be fixed. Cones 608 and 618 are also mounted to permit motion along axis 750 to enable the diameter of each of ring-shaped beams 720 and 722 to be varied to suit the type of lens to be contoured.

A more preferred configuration is to mount elements 604, 606 and 608 together inside a tube or other similar manner such that element movement from side to side perpendicular to axis 750 which can affect alignment is minimized. The elements can then simply be moved along the walls of the tube (and therefore along axis 750) to accomplish beam focussing and beam diameter adjustment. Elements 614, 616 and 618 can likewise be mounted in a similar fashion to provide a system which is less likely to become misaligned during use.

To obtain flexibility in achieving proper concentricity of beam 720 with beam 722, it can be desirable to mount elements 610, 604, 606 and 608 in a fixed fashion and to mount elements 612''', 614, 616 and 618 together on a base which can be moved transversely relative to axis 750 passing through the fixed elements or vice-versa. In this manner, each set of elements is moved relative to the other to achieve optimum alignment of both sets of elements along axis 750. Alignment can be accomplished by performing a gross manual alignment and thereafter finer adjustments in alignment and beam focus can be made by directing a beam from the laser source 600 at a workpiece and observing the edge contour obtained. Alternatively, the beam from a low power laser source such as a helium-neon visible laser 640 can be used to visually align the elements followed by test contouring a workpiece to obtain fine adjustment of the alignment and beam focus. Preferably, the alignment is done with a low powered laser of the same type as the source laser 600 since the focus differs somewhat for differing wavelengths of radiation.

After alignment, the apparatus of FIGS. 4 and 5 can be used to edge contour and sever a lens such as a contact lens from workpiece 500. Edge contouring and severing can be accomplished simultaneously by sending beam 620 into beam splitter 602 such that ring-shaped beams 720 and 722 impinge upon surfaces 501 and 502, respectively, at the same time. For example, a thin plate with an aperture which is large enough to permit beam 722 to pass through the aperture, but small enough in diameter to prevent the severed lens from falling through the aperture can be attached to holder 630 on the side facing cone 618.

The area around holder 630 is purged and maintained under an inert cover gas such as helium for the purpose of reducing the possibility of lens surface charring. It is also preferred that a stream of inert gas (preferably the same gas as the cover gas) such as helium be continuously passed over the interior of both reflective cones toward the workpiece so that vaporized lens material is carried away from the optical elements to reduce the need for cleaning such elements.

Alternatively, a tiltable mirror can be installed at the point where beam splitter 602 is located to enable one to direct beam 620 first to one beam focussing means and then tilted to enable the beam to enter the other beam focussing means. Obviously, a laser beam 620 having a sufficient power to contour both surfaces of workpiece 500 simultaneously would have to be reduced in intensity by about one-half if one wished to contour one surface at a time. When this method is used, one has the advantage that the workpiece 500 does not have to be moved or turned to accomplish contouring of the opposite side and that reduces the chances that one side will be contoured off-center relative to the other side.

The following beam focussing elements were used to produce an apparatus of the type shown in FIGS. 4 and 5 for use in edge contouring a silicone elastomer contact lens having a nominal diameter of 11.3 mm using a Spectra-Physics Model 810 fast-axial flow carbon dioxide laser having a nominal power output of about 600 watts and contained a 2× beam expander to produce a 10.6 micron wavelength circular beam having a diameter of 1 inch. This was less than the optimum 1.5 inch diameter (38.1 mm) beam diameter [diameter 755 in FIG. 5 is 1.5 inches (38.1 mm)] for which the laser optics system used (and described, infra) was designed. A 6.0 microsecond gated pulse (650 watts peak power) delivered from the laser source through the upper beam focussing means of FIG. 4 to the upper surface of the workpiece was observed to make a circular cut to a depth of 0.0045 inches (0.114 mm) and the anterior peripheral lens surface of the workpiece was observed to have a crisp curl-over (contour) all around the peripheral edge of the anterior lens surface.

The lenses used in the above testing were designed to receive a 1.5 inch (38.1 mm) diameter laser beam and were as follows:

Refractive focussing elements 604 and 614 were both 50.80 mm+0,−0.25 in diameter having a 5.08 mm±0.10 center thickness which were plano on the side facing the workpiece and convex on the opposite side with the convex lens face having a radius of curvature of 318.5 mm ±0.5 with a clear aperture of 43.18 mm for each lens surface. The lens material was optical grade zinc selenide and each lens surface was antireflective coated for 10.6 micron wavelength radiation at normal incidence assuming a power density of about 300 watts/cm.

Each axicon 606 and 616 was made of optical grade zinc selenide, had a diameter of 50.800 mm+0,−0.025 with a center thickness of 10.66 mm±0.50, a plano back surface and a conical front surface where angle 770 in FIG. 5 was 10°0.5566±0.033. The conical surface straightness was 2 fringes peak to valley (i.e., the maximum to minimum variation between a test plate surface and the conical surface expressed in number of fringes or half-wavelengths of radiation) on any meridian with a clear aperture for each lens surface of 43.18 mm. The plano side was antireflective coated for 10.6 micron radiation at normal incidence and the conical side was antireflective coated for 10.6 microns radiation at 30°±5° angle of incidence assuming a power density of about 400 watts/cm.

Cone 608 was manufactured of fused silica having a maximum outer diameter of 101.60 mm+0,−0.025 and a thickness of 22.00 mm±0.1. The internal reflective surface 609 had a clear aperture extending from 1 mm from the edge of the cone facing the workpiece to 2 mm from the opposite end of the cone. Cone 608 had a inner diameter of 69.37 mm±0.10 on the side facing away from the workpiece. The angle of the conical interior reflective surface 609 relative to axis 750 was 10°0.000±0.033.

Cone 618 was also manufactured of a fused silica having the same outer diameter as cone 608 with a thickness of 28.0 mm±0.1. Internal reflective surface 619 had a clear aperture which extended 3 mm from each edge had diameter of 71.0 mm±0.2 on the side facing away from the workpiece and the angle of the conical interior reflective surface 619 relative to axis 750 was 15°0.000±0.033. The cone straightness was 4 fringes peak to valley along every meridian. The central axis of each cone 608 and 618 is centered and parallel with the outside peripheral surface 6008 and 6018 respectively within ±0.025 mm and that central axis is perpendicular to surface 6008' and 6018' to within ±0.1 mm to facilitate accurate mounting of the cone. The reflectivity at 10.6 micron wavelength radiation at a 60° angle of incidence assuming a power density of about 600 watts/cm. The reflective coating used on the conical reflective surface was a chromium gold coating.

While the above laser optics system has been described with reference to contact lenses, the invention also has applicability to edge contouring other types of curved articles such as intraocular lenses or camera lenses. Other modifications and variations of the laser optics system of the present invention will become apparent to those skilled in the art from an examination of the above specification and drawings. Therefore, other variations of the present invention may be made which fall within the scope of the appended claims even though such variations were not specifically discussed above.

That which is claimed is:

1. A laser optics system for generating a ring-shaped beam of electromagnetic radiation for use in contouring and severing a lens-shaped article article having a curved surface from a workpiece, said system consisting essentially of
   A. a focussing element for receiving a circular beam of electromagnetic radiation from an appropriate laser source and transforming said beam into a ring-shaped beam of electromagnetic radiation, said element having two opposed surfaces wherein one of said surfaces is a convex lens surface and the opposite surface is a conical surface which forms an axicon, said element being situated in the path of and concentric with the central long axis of said circular beam such that the circular beam enters the convex surface and the ring-shaped beam concentric with said circular beam emerging from the axicon surface is received by
   B. a reflective element having a conical reflective surface situated at such an angle and situated in such a position relative to the central long axis of said ring-shaped beam to cause a ring-shaped beam of a preselected diameter to impinge upon a curved workpiece surface located beyond the focussing element and reflective element at a preselected angle with respect to the curved surface of the workpiece.

2. The laser optical system as claimed in claim 1 wherein said focussing element consists of two opposed, concentric lenses, a first focussing lens having a convex surface situated opposite a plano surface and a second ring-shaped beam generating lens having a plano surface situated opposite a conical lens surface forming an axicon wherein said plano surfaces of the first and second focussing lenses face each other.

3. The laser optical system as claimed in claim 1 wherein the conical surface of said second lens is rotationally symmetric and is defined by a straight line running from the optical center of the lens to the peripheral edge of the lens and said straight line is situated at a preselected angle with respect to the central axis of the lens.

4. The laser optical system as claimed in claim 1 wherein the reflective element is hollow and has an interior reflective surface for reflecting said beam located within the hollow portion of said reflective element.

5. The laser optical system as claimed in claim 2 wherein the reflective element is hollow and has an interior reflective surface for reflecting said beam located within the hollow portion of said reflective element.

6. The laser optical system as claimed in claim 3 wherein the reflective element is hollow and has an interior reflective surface for reflecting said beam located within the hollow portion of said reflective element.

7. The laser optics system as claimed in claim 1 wherein the ring-shaped beam impinges upon said curved workpiece surface at an angle which is substantially perpendicular to the curved workpiece surface.

* * * * *